United States Patent Office 3,529,038
Patented Sept. 15, 1970

3,529,038
DYEABLE PROPYLENE/STYRENE CO-POLYMERS AND MIXTURES WITH ISOTACTIC POLYOLEFINS
Henri Chabert and Albert Perez, Lyon, and Gerard Seibold, Boulogne Billancourt, France, assignors to Rhone-Poulenc S.A., Paris, France, a French body corporate
No Drawing. Filed July 7, 1967, Ser. No. 651,697
Claims priority, application France, July 11, 1966, 68,989
Int. Cl. C08f 7/04
U.S. Cl. 260—897                                3 Claims

ABSTRACT OF THE DISCLOSURE

Highly crystalline propylene-styrene copolymers, and their mixtures with compatible polymers, in which the aromatic nuclei are substituted by methyl radicals attached to quaternary ammonium groups, have improved dyeability.

---

This invention relates to dyeable propylene-styrene copolymers of a high degree of crystallinity.

It is known from French patent specification No. 1,282,751 to modify certain crystalline aliphatic polyolefines, especially isotactic polypropylene, to render them capable of being dyed. This modification consists of intimately mixing styrene with isotactic polypropylene and then subjecting this mixture to a polymerisation treatment in the presence of catalysts which produce free radicals. The polymer combination so produced is then halogenoalkylated and treated with a tertiary amine to introduce into the aromatic nuclei alkyl radicals substituted by quaternary ammonium groups. It is obvious that this polymer combination preserves the basic structure of the polypropylene.

New highly crystalline copolymers have now been found which consist wholly or partly of propylene-styrene copolymers whose aromatic (phenyl) nuclei have methyl radicals substituted by quaternary ammonium groups. These copolymers, whose structure differs from that of the products of French patent specification No. 1,282,751, have a remarkable dyeability and good mechanical properties. Filaments and fibers made from these copolymers may be dyed throughout in very deep shades or in black. The new copolymers also have the advantage of having a very high tack temperature (of the order of 180° C.) and of not becoming charged with static electricity in use. Mixtures with other less dyeable polymers, for example isotactic polypropylene, also have good dyeability.

The new copolymers may be obtained by reacting a highly crystalline propylene-styrene copolymer containing 2 to 40% by weight of styrene residues, or a mixture of a highly crystalline propylene-styrene copolymer and a compatible non-dyeable inert polymer, especially isotactic polypropylene, the copolymer containing up to 80% by weight, and the mixture 2 to 40% by weight, of styrene residues, with a chloromethylating agent and reacting the chloromethylated product with a tertiary amine. The copolymer starting material, or the mixture thereof with non-dyeable polymer (as the case may be), preferably contains 2 to 20%, by weight of styrene residues.

The chloromethylation reaction may be carried out on a pure propylene-styrene copolymer, or a mixture as defined above, in the form of a powder or a shaped article such as a filament, fibre or film. The various chloromethylating reagents are well known in the art, and include, for example, a mixture of formaldehyde and hydrogen chloride, methyl chloromethyl ether, and ethyl chloromethyl ether. The reaction is generally carried out in the presence of a catalyst, and catalysts for reactions of the Friedel-Crafts type such as aluminium chloride, zinc chloride, titanium tetrachloride or boron trifluoride are very suitable for this purpose. The chloromethylation temperature is not critical and the reaction may take place at a temperature as low as 0° C. or at much higher temperatures, e.g. 150° to 200° C. working at atmospheric or superatmospheric pressure. It is however preferable not to work at too low a temperature so as to have a sufficient speed of reaction. Equally, it is preferable not to work at too high a temperature so as to restrict the thermal deterioration of the copolymer. The chloromethylation may take place in the liquid phase or in the vapour phase. When working in the liquid phase, it is possible to carry out the reaction with or without diluent. Working in the liquid phase, without a diluent, at atmospheric pressure and at the boiling point of the chloromethylating reagent used is generally preferred.

The duration of the reaction varies depending on the degree of chloromethylation envisaged. When shaped articles, especially filaments and films are treated, which it is generally desired to dye throughout, working conditions (especially the duration of reaction) are used which are such that each aromatic nucleus of the copolymer can fix a chloromethyl substituent.

The products so obtained, consisting wholly or partly of chloromethylated crystalline propylene-styrene copolymers, are new.

To introduce the quaternary ammonium groups the chloromethylated product, in the crude or shaped state, is subjected to the action of a tertiary amine. Amongst the various tertiary amines which can be used, there may be quoted the tri(lower alkyl)amines such as trimethylamine or triethylamine, in which the alkyl radicals may have functional groups which are not capable of interfering through side reactions. Alkyl alkanolamines such as dimethylethanolamine may, for example, be used. Heterocyclic amines such as pyridine are equally suitable.

The temperature is not critical and it is possible to work at temperatures ranging from 0° C. to 150° C., preferably from 20° C. to 100° C., with excellent results. Though the reaction can taken place under superatmospheric pressure, working at atmospheric pressure is preferred in practice. The quaternisation may take place in the liquid phase or in the vapour phase; when working in the liquid phase, it is possible to use a diluent, for example water. It is possible to carry out a partial quaternisation; however it is preferable for the reaction to be practically complete.

The products consisting wholly or partly of crystalline propylene-styrene copolymers containing methyl radicals substituted by quaternary ammonium groups are new products which, as a result of the presence of the quaternary ammonium groups, have reactive centres which are capable of fixing dyestuffs and of thus becoming dyed in very deep shades even at relatively low styrene contents.

The highly crystalline propylene-styrene copolymers used in this invention may be obtained by any process for the copolymerisation of olefines which is capable of yielding products of a high degree of crystallinity. For this purpose it is advantageous to work in the presence of a stereospecific catalyst such as those described in French patent specification No. 1,231,089, such as for example a combination of titanium trichloride, ethyldichloroaluminium and tris(dimethylamino) phosphine oxide. Though the copolymerisation can take place at a temperature as low as 0° C., it is preferable to work at between 40° and 85° C. at a pressure which is advantageously fixed at between 1 and 150 kg./cm.². The process may take place in the presence of hydrocarbon solvents such as saturated aliphatic hydrocarbons or aromatic hydrocarbons, but it may equally be carried out in the liquid monomers in the absence of any added solvent.

The dystuffs for which the quaternised propylene-styrene copolymers have affinity are principally acid dyestuffs, metal-containing dyestuffs, disperse dyestuffs, direct dyestuffs, and reactive dyestuffs.

The shades obtained may be very deep and the dyebaths are generally exhausted. It is also possible to obtain very deep blacks. The exhaustion of the dyebaths is comparable with that achieved with polyamide fibres of the nylon type or with cotton, so that dyeing mixtures of the abovementioned fibres with fibres produced from the copolymers of the present invention does not pose any difficulty.

The fastness of the dyeing is remarkable. The colours obtained are stable to light, and withstand washing, dry cleaning and rubbing.

The following examples illustrate the invention.

EXAMPLE 1

20 g. of a propylene-styrene copolymer prepared as described below, 300 g. of methyl chloromethyl ether, and 3 g. of anhydrous zinc chloride are introduced into a 1 litre flask and heated under reflux for 2 hours. The mixture is filtered and the resulting powder is heated with 300 cm.$^3$ of methanol for 2 hours at the boiling point of the latter, and then dried to constant weight. The chloromethylation reaction is practically complete relative to the styrene.

10 g. of the chloromethylated copolymer are immersed with stirring for 2 hours, at a temperature of 20–25° C., in 500 g. of an aqueous solution containing 25% by weight of trimethylamine. The product obtained after filtration is washed with water, then with 200 cm.$^3$ of an aqueous solution of hydrochloric acid containing 95 cm.$^3$ of water to 5 cm.$^3$ of concentrated hydrochloric acid, and again with water until neutral.

The powdered copolymer obtained is dyed with Lanasyne Blue GL (Colour Index No. 61,135), which is an acid dyestuff. The dyebath contains 0.5 cm.$^3$/litre of Sunaphtol LT (a surface-active agent obtained by reaction of ethylene oxide with linseed oil), 2 cm.$^3$/litre of pure acetic acid, and 0.6 g./litre of Lanasyne Blue GL. The bath ratio, which represents the ratio of the weight of filament in g. to the volume of the dyebath in cm.$^3$, is 1/50, the temperature is 100° C., and the duration of treatment is 1 hour. The dyeing obtained is very fast, and the dyestuff cannot be extracted by methanol or acetone at the boil.

The propylene-styrene copolymer used in this example may be obtained in the following manner. 850 g. of propylene and a catalyst consisting of a suspension of 3 g. of titanium trichloride, 7.4 g. of ethyldichloroaluminium and 6.3 g. of tris(dimethylamino)phosphine oxide in 40 cm.$^3$ of anhydrous toluene are introduced into a stainless steel autoclave of 3.6 l. capacity which has been previously dried and purged with nitrogen. The mixture is heated to 45–50° C. and a mixture containing 85 g. of propylene and 165 g. of styrene is then injected over the course of 4 hours, with good stirring. After cooling to 20° C., the unreacted propylene is removed and the polymerisation is stopped by immersing the copolymer powder so obtained in 2000 cm.$^3$ of methanol. The mixture is vacuum-filtered and the catalyst residues are eliminated by refluxing the polymer for 8 hours with 3000 cm.$^3$ of a mixture (90/10 by volume) of methanol and aqueous hydrochloric acid ($d=1.18$). The mixture is vacuum-filtered, and the residue is washed on the filter with a mixture of methanol and water (50/50 by volume) until neutral, and then treated with 3000 cm.$^3$ of pure methanol under reflux for 4 hours. The copolymer is dried at 50° C. under reduced pressure (50 mm. Hg) to constant weight. 680 g. of a white powder consisting of a propylene-styrene copolymer, whose infrared spectrographic analysis shows a styrene content of 7% by weight, are obtained. Differential thermal analysis and determination of the optical melting point show the high degree of crystallinity of the copolymer and the absence of a homopolymer.

EXAMPLE 2

The procedure of Example 1 is followed, replacing the aqueous trimethylamine solution by 500 g. of pure pyridine. As in Example 1, the fixed dyestuff cannot be extracted with methanol or acetone at the boil.

EXAMPLE 3

670 g. of proylene and a catalyst consisting of a suspension of 4 g. of titanium trichloride, 10 g. of ethyldichloroaluminium and 8.6 g. of tris(dimethylamino)phosphine oxide in 40 cm.$^3$ of anhydrous toluene are introduced into a stainless steel autoclave of 3.6 litres capacity which has previously been dried and purged with nitrogen. The mixture is heated to 45–50° C. with good stirring and 415 g. of styrene are then injected over the course of 4 hours. After having carried out various treatments indicated in Example 1, 730 g. of a white powder consisting of a crystalline propylene-styrene copolymer of tack temperature 190° C., containing 12% by weight of styrene, are obtained.

The copolymer so prepared is converted into a 12 to 13 denier filament by melt spinning. The filament has a tensile strength of 6 g./denier and an elongation at break of 14%. 9 g. of the filament, 900 cm.$^3$ of methyl chloromethyl ether and 9 g. of anhydrous zinc chloride are introduced into a glass flask of 2 litres capacity, and the chloromethylation and washing is then carried out as described in Example 1.

The chloromethylated filament is immersed for 4 hours at 20–25° C. in an aqueous solution containing 25% by weight of trimethylamine, and is then washed as described in Example 1.

The resulting filament which has excellent antistatic properties is then subjected to various dyeing tests:

(1) Dyeing with acid dyestuffs (a) Polar Brilliant Blue RAW (Colour Index No. 61,585). The dyebath contains 1 g./litre of Lenetol NS (FMC) (a non-ionic surface-active agent obtained by condensing ethylene oxide with an alkylphenol), 2 cm.$^3$/litre of pure acetic acid, and 0.5% of the dyestuff relative to the weight of material to be dyed. The bath ratio is 1/50 an dyeing is carried out for 1 hour at 100° C. The resulting shade is light and the bath is exhausted. The same experiment with 3% of dyestuff gives a deep shade and the bath is exhausted. With 5% of dyestuff the shade is very dark.

(b) Rilsan W Black and Benzyl Solid Black 3B (Colour Index No. 26,370).

These dyestuffs are applied by working as indicated above but using 10% of dyestuff. A very deep black, with exhaustion of the bath, is obtained.

(2) Dyeing with metal-containing dyestuffs

The dyebath contains 1 cm.$^3$/litre of Lenetol NS (FMC), 1 cm.$^3$/litre of pure acetic, and 5% of Irgalane Blue FGL (Colour Index: Acid Blue 186). The bath ratio is 1/50 and dyeing is carried out for 1 hour at 98–100° C. The bath is exhausted and a deep shade is obtained.

(3) Dyeing with disperse dyestuffs

The dyebath contains 1 cm.$^3$/litre of Lenetol NS (FMC), and 3% of Celliton Solid Blue FFR (Colour Index No. 61,505). The bath ratio is 1/50 and dyeing takes 1 hour at 98–100° C. A rather deep medium blue is obtained.

(4) Dyeing with direct dyestuffs

The procedure followed is as for the acid dyestuffs, using 3% of Chlorantine Fast Brilliant Blue 2 GLL (Colour Index No. 51,300). A rather deep medium blue is obtained.

(5) Dyeing with reactive dyestuffs

The same procedure as for acid dyestuffs is followed, using a 3% of Cibacrone Blue 3 G (Colour Index:Reactive Blue 2). A medium greenish blue is obtained.

In order to demonstrate the fastness of the dyeing, samples dyed with Polar Brilliant Blue RAW and with Rilson W Black (Sandoz) are subjected to various tests described in the "Fastness Code," second edition of 1958, 1963 supplements entitled "Methods for the determination of the Fastness of Dyeings and Printings on Textiles" and published by the "Association for the Study and Publication of Methods for the Determination of Fastness."

Fastness to light

The sample is subjected to radiation from a xenon lamp which has a spectrum whose composition is close to that of solar light. A "Xenotest" apparatus is used for this purpose. A range of standards produced by eight blue dyeings on wool, defined in the abovementioned Code, are exposed simultaneously. These standards have a light fastness numbered from 1 to 8 going from the least fast to the fastest, so that after a sufficient exposure time it is sufficient to determine, by comparison, which standard has undergone the same deterioration as the sample in order to number the fastness to light of the sample.

Fastness to washing at 40° C.

A dyed sample placed in contact with a white fabric is agitated by suitable mechanical means for ½ an hour in a soapy solution at a temperature of 40° C. The composite sample is then rinsed and dried. The deterioration of the sample and the discharge onto the white fabric are evaluated against grey scales. The grey scales, which are described in the abovementioned Code, allow a fastness number to be determined. This fastness number, which varies from 1 to 5, measures the difference in colour in the following manner:

| Colour difference (in NBS units) | Corresponding fastness number |
| --- | --- |
| 0 | 5 |
| 1.5 | 4 |
| 3 | 3 |
| 6 | 2 |
| 12 | 1 |

Fastness to dry cleaning

A sample is agitated in perchlorethylene, then suction-dried or centrifuged and directly dried with hot air. The deterioration of the sample and the colouration of the solvent are evaluated by means of the grey scales. The test carried out is more severe than that described in the Fastness Code because it is carried out at a temperature of 40° C. instead of 30° C.

Fastness to rubbing

The samples are rubbed with a dry white cotton fabric and the discharge onto this white fabric is then evaluated by comparison with the grey scales.

The various results obtained are shown in the table below:

| Fastness | Polar Brilliant Blue RAW, 3% concentration. | Rilsan W Black, 10% concentration |
| --- | --- | --- |
| Light (Xenotest) | 5-6 | 7. |
| Washing at 40° C | Deterioration 5. Discharge 5. | Deterioration 5. Discharge 4. |
| Dry cleaning (40° C) | Deterioration 5. Discharge 5. | Deterioration 5. Discharge 3-4. |
| Rubbing | 5 | 5. |

EXAMPLE 4

The procedure of Example 3 is followed in order to produce the chloromethylated filament. 1 g. of the chloromethylated filament is treated with 100 cm.³ of pyridine for 2 minutes at the boil. After washing and dyeing with Lanasyne GL Blue as described in Example 1, a filament which is dyed throughout and whose colour cannot be extracted by acetone or methanol at the boil is obtained. This filament has very good antistatic properties.

EXAMPLE 5

2 g. of a propylene-styrene copolymer filament prepared as indicated below, 200 cm.³ of methyl chloromethyl ether and 2 g. of anhydrous zinc chloride are introduced into a 500 cm.³ capacity flask. The chloromethylation and washing is carried out as described in Example 1. The chloromethylated filament is then immersed for 4 hours at a temperature of 20–25° C. in 300 cm.³ of an aqueous solution containing 25% by weight of trimethylamine, and is then washed as in Example 1. Dyeing is carried out as in Example 1. The fixed dyestuff cannot be extracted by methanol or acetone at the boil.

The propylene-styrene copolymer and the filament prepared from this copolymer for the above experiment were obtained in the following manner. 600 g. of propylene, 200 g. of styrene and a catalyst consisting of a suspension of 4 g. of titanium trichloride, 10 g. of ethyldichloroaluminium and 8.6 g. of tris(dimethylamino)phosphine oxide in 40 cm.³ of anhydrous toluene are introduced into a stainless steel autoclave of 3.6 litres capacity which has previously been dried and purged with nitrogen. The mixture is heated at 45–50° C. with good stirring and 400 g. of styrene are then injected over the course of 4 hours 30 minutes. After carrying out the various treatments indicated in Example 1, 600 g. of a white powder consisting of a crystalline copolymer of propylene and styrene containing 20% by weight of styrene are obtained. The copolymer prepared in this way is converted into a 12 to 13 denier filament by melt spinning. The filament obtained has a tensile strength of 5.5 g./denier and an elongation at break of 13%, and its tack temperature is 180° C.

EXAMPLE 6

167 g. of isotactic polypropylene powder are mixed with 33 g. of an isotactic propylene-styrene copolymer, again in the form of a powder, containing 76% by weight of styrene and prepared as indicated below. The mixture is stabilised against oxidation and thermal decomposition and is then homogenised by two extrusions at 200° C.–220° C. The resulting product, which contains 12.5% by weight of styrene, is converted into a 10 denier filament by melt spinning. This filament has a tensile strength of 6.5 g./denier, and an elongation at break of 14% and a tack temperature of 180° C.

2 g. of filament, 200 cm.³ of methyl chloromethyl ether, and 2 g. of anhydrous zinc chloride are introduced into a glass flask of 500 cm.³ capacity and heated under reflux for 2 hours. The filament is then washed with 200 cm.³ of methanol under reflux, dried to constant weight, and then immersed for 4 hours at 20° C.–25° C. in an aqueous solution containing 25% by weight of trimethylamine. The material is washed with water, then with 200 cm.³ of N/2 hydrochloric acid, and again with water until neutral.

The filament so obtained is dyed with Lanasyne Blue GL as described in Example 1. The fixed dyestuff cannot be extracted by methanol or acetone at the boil.

The propylene-styrene copolymer used in this example is prepared in the following manner. 120 g. of propylene, 540 g. of styrene and a catalyst consisting of a suspension of 4 g. of titanium trichloride, 9.9 g. of ethyldichloroaluminium and 8.6 g. of tris(dimethylamino)phosphine oxide in 40 cm.³ of anhydrous toluene are introduced into a stainless steel autoclave of 3.6 litres capacity which has previously been dried and purged with nitrogen. The mixture is heated to 45–50° C. with good stirring and 540 g. of styrene are then injected in the course of 4 hours 30 minutes. After having carried out the various treatments described in Example 1, 258 g. of a white powder consisting of a crystalline propylene-styrene copolymer containing 76% by weight of styrene are obtained.

EXAMPLE 7

80 g. of isotactic polypropylene powder is mixed with 120 g. of a propylene-styrene copolymer powder containing 27.5% by weight of styrene (prepared as described below). Proceeding as described in Example 6, a 25-denier filament is obtained having a tensile strength of 7 g./denier and an elongation at break of 12%. This filament is then chloromethylated, quaternized and dyed as described in Example 6. The fixed dyestuff cannot be extracted with methanol or acetone at the boil.

The propylene-styrene copolymer used in this example is prepared in the following manner. 500 g. of propylene and a catalyst consisting of 4 g. of titanium trichloride, 9.8 g. of aluminum trichloride, and 4.6 g. of tris-(dimethylamino)phosphine oxide in 40 cm.$^3$ of anhydrous toluene are introduced into a 3.6 litre stainless steel autoclave, previously dried and purged with nitrogen. The mixture is agitated and heated to 45–50° C. and 500 g. of styrene and 30 mg. of hydrogen are injected in the course of 4 hours. After carrying out the various treatments indicated in Example 1, 470 g. of a white powder consisting of a crystalline propylene-styrene copolymer containing 27.5% by weight of styrene are obtained.

We claim:

1. Dyeable highly crystalline, random propylene-styrene copolymers, prepared by copolymerization of styrene monomer and propylene monomer, and mixtures thereof with non-dyeable compatible, isotactic aliphatic polyolefins, in which the aromatic nuclei are substituted by methyl radicals attached to quaternary ammonium groups, wherein said substitutiion is effected by reacting with a chloromethylating agent, and reacting the chloromethylated product with a tertiary amine, the proportion of styrene residues in the unmixed unsubstituted random copolymer being 2 to 40% by weight, and in the mixture the unsubstituted random copolymer contains 2 to 80% by weight of said styrene residues, the total mixture containing 2 to 40% by weight of the said styrene residues.

2. Propylene-styrene copolymers according to claim 1 mixed with isotactic polypropylene.

3. Propylene-styrene copolymers, and mixtures containing the same according to claim 1 dyed with an acid dyestuff, a metal-containing dyestuff, a disperse dyestuff, a direct dyestuff, or a reactive dyestuff.

References Cited

UNITED STATES PATENTS 3,230,029 1/1966 Cappuccio et al. _____ 8—55
3,407,253 10/1968 Yoshimura et al. ____ 264—289
3,021,288 2/1962 Kressman _____ 260—2.1

FOREIGN PATENTS 896,739 5/1962 Great Britain.

MURRAY TILLMAN, Primary Examiner

C. J. SECCURO, Assistant Examiner

U.S. Cl. X.R.

260—2.1; 88.2